US012042469B2

(12) United States Patent
Gregory et al.

(10) Patent No.: US 12,042,469 B2
(45) Date of Patent: Jul. 23, 2024

(54) ADAPTER FOR A FLUID TRANSFER DEVICE

(71) Applicant: MannKind Corporation, Danbury, CT (US)

(72) Inventors: Christopher Gregory, Søborg (DK); Michael Barenboym, Søborg (DK)

(73) Assignee: MannKind Corporation, Danbury, CT (US)

( * ) Notice: Subject to any disclaimer, the term of this patent is extended or adjusted under 35 U.S.C. 154(b) by 44 days.

(21) Appl. No.: 17/633,379

(22) PCT Filed: Aug. 5, 2020

(86) PCT No.: PCT/EP2020/071963
§ 371 (c)(1),
(2) Date: Feb. 7, 2022

(87) PCT Pub. No.: WO2021/037502
PCT Pub. Date: Mar. 4, 2021

(65) Prior Publication Data

US 2022/0296471 A1 Sep. 22, 2022

Related U.S. Application Data

(60) Provisional application No. 62/890,841, filed on Aug. 23, 2019.

(51) Int. Cl.
*A61J 1/20* (2006.01)
*A61J 1/14* (2023.01)

(52) U.S. Cl.
CPC ........... *A61J 1/2055* (2015.05); *A61J 1/1406* (2013.01); *A61J 1/1481* (2015.05); *A61J 1/201* (2015.05); *A61J 1/2079* (2015.05); *A61J 1/2096* (2013.01)

(58) Field of Classification Search
CPC ....... A61J 1/2048; A61J 1/1481; A61J 1/2096
(Continued)

(56) References Cited

U.S. PATENT DOCUMENTS 5,171,214 A * 12/1992 Kolber .................. A61J 1/2096 604/82
5,566,729 A * 10/1996 Grabenkort ........... A61J 1/2089 141/318
(Continued)

FOREIGN PATENT DOCUMENTS

DE 4002858 A1 9/1990
EP 1498097 A2 1/2005
(Continued)

OTHER PUBLICATIONS

International Search Report and Written Opinion mailed Jan. 28, 2021 for International Patent Application No. PCT/EP2020/071963.

*Primary Examiner* — Timothy L Maust
(74) *Attorney, Agent, or Firm* — Morgan, Lewis & Bockius LLP

(57) ABSTRACT

An adapter (650) for transferring fluid between a first device (100) and a second device (800). The adapter comprises a first end (652) for receiving the first device, wherein the first end includes a side wall for locating around the first device (100). The adapter (650) further comprises a second end (654) for engaging the first device (100), and including a retaining member (656; 658; 662), wherein the retaining member (656; 658; 662) is operable to prevent removal of the first device (100) from the adapter (650) upon engagement of the first device (100) with the second end (654). The first end (652) and the second end (654) are open on both ends to comprise a through-bore extending through the adapter (650). In some cases, the first device (100) may be a drug pen containing insulin.

41 Claims, 7 Drawing Sheets

(58) Field of Classification Search
USPC .................................................. 604/411, 412
See application file for complete search history.

(56) References Cited

U.S. PATENT DOCUMENTS

| | | | | |
|---|---|---|---|---|
| 6,223,792 | B1 * | 5/2001 | Slagle .................. | B65D 47/243 141/345 |
| 6,237,649 | B1 * | 5/2001 | Moisio ............... | B65D 81/3211 141/319 |
| 6,706,031 | B2 * | 3/2004 | Manera ................. | A61J 1/2096 604/905 |
| 7,690,521 | B1 * | 4/2010 | Herrera .................... | A61J 11/04 215/11.1 |
| 8,109,399 | B1 * | 2/2012 | Sheffield ................ | B65D 51/24 215/390 |
| 8,689,987 | B2 * | 4/2014 | Lewis ....................... | A61J 9/00 215/276 |
| 9,494,264 | B2 * | 11/2016 | Avery ..................... | A61M 5/24 |
| 2015/0020919 | A1 * | 1/2015 | Wu ....................... | A61J 1/2089 141/27 |

FOREIGN PATENT DOCUMENTS

| | | | |
|---|---|---|---|
| FR | 1122616 | A | 9/1956 |
| FR | 2307725 | A1 | 11/1976 |
| WO | 1997025015 | A1 | 7/1997 |
| WO | 2010129583 | A1 | 11/2010 |
| WO | 2019152589 | A1 | 8/2019 |

* cited by examiner

ADAPTER FOR A FLUID TRANSFER DEVICE

CROSS REFERENCE TO RELATED APPLICATIONS

This application is a U.S. National Stage Application that claims the benefit of International PCT Application No. PCT/EP2020/071963 filed Aug. 5, 2020, which claims the benefit of U.S. Provisional Patent Application No. 62/890,841 filed Aug. 23, 2019, entitled “Adapter for a Fluid Transfer Device”, each of which is incorporated by reference herein in its entirety.

FIELD OF THE INVENTION

The present invention generally relates to a fluid transfer device and more particularly to an adapter for a fluid transfer device.

BACKGROUND

In many countries, specific drugs such as insulin are only available in pen or cartridge form and not in a drug vial. Further, there may be drugs, such as higher concentration insulins, which are only available in pens. Drugs stored in the pen or cartridge format cannot be easily transferred into a patch pump, such as the V-Go® owned by Zealand Pharma A/S or the products disclosed in WO 2004/094823 or WO 2011/046950, which are hereby incorporated by reference in its entirety. This is because the filling devices for these patch pumps are designed to work with only a vial. These filling devices include the Ez Fill product or the products disclosed in WO 2010/129583, which is hereby incorporated by reference in its entirety. The Ez Fill product functions by transferring a drug stored in a vial into a reservoir of the V-Go® drug delivery device. The Ez Fill product is a preferred method of refilling the patch pump since the Ez Fill product removes the air from the vial during the transfer to the reservoir and then transfers the air back into the vial. This two way transfer results in no change in the contained total volume of drug and air, and thus no increase in pressure or escaping drug.

Instead of vials, drug pens and cartridges may be used to transfer insulin or other drugs to the patch pump. Drug pens or cartridges have septum seal ends on their reservoirs and can be fit in the Ez Fill or similar devices. However, the construction and shape of these drug pens and cartridges may make them difficult for use in transferring fluid, such as insulin or other drugs therefrom, to the Ez Fill or similar devices.

Furthermore, the two-way transfer of insulin and air can be affected when using a pen or cartridge compared to a vial. In that respect, the transfer of air into the pen/cartridge as the drug is transferred out will result in a partially filled pen/cartridge. When the pen/cartridge is removed from the Ez Fill product, they could then be used in a conventional manner without the user realizing that the pen/cartridge is only partially filled with the drug. This can result in a significant under dose as the pen/cartridge mechanism will still work normally and infer to the user that a volume of drug has been delivered, while much of the volume may be air instead of the drug. The present invention may provide a device that allows the sealed transfer of drug into a patch pump, such as the V-Go®, without also ending up with a pen or cartridge partially filled with air.

SUMMARY OF THE INVENTION

According to a first aspect of the invention, there is provided an adapter for transferring fluid between a first device and a second device, the adapter comprising: a first end for receiving the first device, wherein the first end includes a side wall for locating around the first device; a second end for engaging the first device, and including a retaining member, wherein the retaining member is operable to prevent removal of the first device from the adapter upon engagement of the first device with the second end; wherein the first end and the second end are open on both ends to comprise a through-bore extending through the adapter.

By virtue of the retaining member being operable to prevent removal of the first device from the adapter upon engagement of the first device with the second end, this prevents the first device from being subsequently re-used after the fluid has been decanted therefrom by a user, which might otherwise cause such re-use to dispense a significant under dose, which could be dangerous. Furthermore, the overall structure of the adapter which allows for the engagement of the first device therewith provides a convenient arrangement for supporting the first device whilst the fluid is decanted therefrom, which thus may assist with inhibiting leakage from the first device caused by it otherwise not being sufficiently supported during the fluid transfer/decanting process with the second device.

In accordance with some embodiments, to help prevent the removal of the first device from the adapter upon engagement of the first device with the second end, the retaining member may include at least one barb or a plurality of barbs. In some particular embodiments thereof, each barb may project inwardly from the retaining member.

In accordance with some embodiments, to further support the first device during the fluid transfer process, and to control the position of the first device with respect to the adapter, the retaining member may comprise a thread for attaching the adapter to the first device. In some particular embodiments thereof, the thread may be a female thread, e.g. for then connecting with a male thread from the first device.

Where the at least one barb is present, in accordance with some embodiments, the at least one barb may be integrated with the thread of the retaining member.

The first end, in some embodiments, may have a diameter which is larger than a diameter of the second end. The presence of this larger diameter for the first end may therefore assist with the accommodating of larger sized first devices. In that respect as well, in some embodiments, the first end of the adapter may include an outer diameter larger than an outer diameter of the second end.

In accordance with some embodiments, the retaining member may include an inner ring and an outer housing, wherein the inner ring is configured to engage with the outer housing.

Where the inner ring is present, in accordance with some embodiments thereof, the inner ring may be configured to only rotate in one direction relative to the outer housing.

In some particular embodiments thereof, the inner ring may include at least one pawl feature and the outer housing may include at least one catch feature for engaging with the at least one pawl feature. In alternative embodiments thereof, the outer housing may include at least one pawl feature and the inner ring may include at least one catch feature for engaging with the at least one pawl feature.

In accordance with some embodiments, the inner ring and the outer housing may include mating features that engage each other in one of a relative clockwise or anti-clockwise motion and slip past each other in the other of the relative clockwise or counter-clockwise motion. In this way, the mating features allow relative rotation about one of the clockwise or counter-clockwise motion, but not the other motion, thus facilitating the retaining member being operable to allow attachment, but not removal, of the first device from the adapter. In a particular embodiment, the inner ring and the outer housing may include mating features that engage each other in a relative clockwise motion and slip past each other in a relative counter-clockwise motion.

In accordance with some embodiments, the inner ring and the outer housing may have complementary ratchet teeth, which may be axially stacked or concentric to each other. These ratchet teeth thus further facilitate the retaining member being operable to allow attachment, but not removal, of the first device from the adapter.

In some embodiments, the outer housing may further comprise an inwardly projecting shoulder, wherein an end wall of the inner ring is configured to sit on the inwardly projecting shoulder. The provision of the inwardly projecting shoulder further facilitates with the positioning and retention of the inner ring. In some particular embodiments thereof, the complementary ratchet teeth may be located on the end wall of the inner ring and on the inwardly projecting shoulder.

In some embodiments where the inner ring is present, to further support the first device during the fluid transfer process, and to further control the position of the first device with respect to the adapter, the inner ring may comprise the thread for attaching the adapter to the first device.

According to a second aspect of the present invention, there is provided an adapter for transferring fluid between a first device and a second device, the adapter comprising: a first end for receiving the first device, wherein the first end includes a side wall for locating around the first device; a second end for engaging the second device; wherein the first end and the second end are open on both ends to comprise a through-bore extending through the adapter; wherein the adapter further comprises a transfer element in the through-bore for transferring fluid between the first device and the second device, via the adapter, the transfer element comprising a first portion extending in a first direction towards the first end of the adapter, and wherein the transfer element comprises a second portion extending in a second direction towards the second end of the adapter; and wherein a needle is located around the second portion of the transfer element to define an annular space, between the needle and the second portion of the transfer element, for the egressing of air. With the provision of the transfer element and the needle which defines the annular space, this annular space facilitates the egress of air from the second device into which fluid is delivered using the adapter. This egress air can then be exhausted from the adapter as required.

In accordance with some embodiments, the adapter may comprise a port in fluid communication with the through-bore, and/or the annular space where this is present. At least in some applications of the port, the provision of the port may assist with the egress of excess air from the adapter whilst it is in use, such as any excess air in the through-bore and/or the annular space where this is present.

In some embodiments, the port may comprise a filter, which for instance may be for preventing odor from escaping the adapter.

The first end of the adapter, in some embodiments, may comprise a flared portion comprising an internal and/or external diameter which progressively decreases from the first end towards the second end. The provision of the flared portion may provide several advantages, such as assisting with the guiding/insertion of the first device into the adapter. As will be described below in due course, the flared portion may also facilitate the attachment of the adapter to the second device, for instance via the flared portion interacting with any actuation member which might be provided on the second device.

According to a third aspect of the present invention, there is provided an assembly comprising: the adapter of the first or second aspect of the invention; and the second device engaged with the adapter, wherein the second device is a fluid transfer device.

In some embodiments, the second device may comprise a slot for engaging with the adapter, wherein the slot is moveable between a first position in which the slot is closed, and a second position in which the slot is open. In this way, the slot provides a convenient mechanism for preventing the egress/leakage of fluid from the second device when it is not engaged with the adapter.

In some embodiments, in the closed position, the slot may comprise an opening with a first opening size, and wherein in the open position of the slot, the opening comprises a second opening size which is larger than the first opening size.

The second device in accordance with some embodiments may comprise at least one actuation member, wherein each actuation member is configured to engage with the first device to move the slot from the closed position to the open position. As alluded to above, and in accordance with some very particular embodiments, each actuation member may engage with the flared portion of the adapter, where this flared portion is present.

Each actuation member may take a number of different forms as required to allow it to move the slot from the closed position to the open position. However, in some embodiments, each actuation member may be an actuation projection, and which in some particular embodiments may be an actuation projection which projects from the second device in a direction towards the adapter.

To better distribute the actuation forces on each actuation member, in accordance with some embodiments, the at least one actuation member may comprise a plurality of actuation members. In such embodiments, the plurality of actuation members may in some particular embodiments extend around a circumference of the slot. In this way, the slot can be actuated from a number of different positions around the slot using the different actuation members located around the slot.

To further assist with preventing the egress/escape of fluid from the second device when it is not engaged with the adapter, in accordance with some embodiments of the adapter, the slot may be biased towards the first position, for instance by way of a biasing member from the second device.

In some embodiments, the assembly may further comprise the first device engaged with the adapter, wherein the first device is a fluid storage device. In some particular embodiments, the fluid storage device might be a drug pen, and/or may contain a fluid containing insulin or another medicament(s).

In accordance with some embodiments, the first device may further comprise a septum, and the second device further comprises a needle, wherein the needle from the second device pierces the septum of the first device.

According to a fourth aspect of the present invention, there is provided a fluid transfer device configured to receive an adapter, the fluid transfer device comprising: a slot moveable between a first position in which the slot is closed, and a second position in which the slot is open, wherein the slot is configured to receive the adapter; a biasing member for biasing the slot towards the closed position; at least one actuation member for moving the slot from the closed position to the open position; and a needle, proximal or within the slot, for receiving fluid from the adapter. With the combined provision of the slot; the biasing member; and the at least one actuation member, there is provided a fluid transfer device which can conveniently receive fluid via the adapter, and which can conveniently mitigate against any egress/escape of fluid from the second device when it is not engaged with the adapter.

Each actuation member may take a number of different forms as required to allow it to move the slot from the closed position to the open position. However, in some embodiments, each actuation member from the fluid transfer device may be an actuation projection, and which in some particular embodiments may be an actuation projection which projects from the second device in a direction towards the adapter.

To better distribute the actuation forces on each actuation member, in accordance with some embodiments of the fluid transfer device, the at least one actuation member may comprise a plurality of actuation members. In such embodiments, the plurality of actuation members may in some particular embodiments extend around a circumference of the slot. In this way, the slot can be actuated from a number of different positions using the different actuation members located around the slot.

In some embodiments of the fluid transfer device, in the closed position, the slot may comprise an opening with a first opening size, and wherein in the open position of the slot, the opening comprises a second opening size which is larger than the first opening size.

According to a fifth aspect of the present invention, there is provided a method of transferring a fluid comprising:

inserting a fluid storage device, into an adapter, the fluid storage device including a tip having a thread;

rotating the adapter relative to the fluid storage device to non-removably threadably engage the adapter with the tip, wherein the adapter is configured to only allow the tip to rotate in a single direction relative to the adapter;

coupling the fluid storage device and the adapter to a fluid transfer device, the fluid transfer device configured to couple with the adapter; and transferring fluid from the fluid storage device to the fluid transfer device through the adapter.

In some embodiments of the method, the method may further comprise: piercing a septum from the fluid storage device with a needle from the fluid transfer device; and transferring fluid from the fluid storage device to the fluid transfer device through the adapter, and via the needle.

In accordance with some embodiments of the method, coupling the fluid storage device and the adapter to the fluid transfer device may further comprise: engaging the adapter in a slot of the fluid transfer device. In accordance with some particular embodiments thereof, coupling the fluid storage device and the adapter to the fluid transfer device may further comprise: engaging at least one actuation member from the fluid transfer device with the fluid storage device to move the slot from a closed position to an open position.

In some embodiments, the fluid storage device might be a drug pen.

In some embodiments, the fluid may contain insulin and/or another medicament(s).

BRIEF DESCRIPTION OF THE SEVERAL VIEWS OF THE DRAWINGS

The following detailed description of embodiments of an adapter for a drug delivery device will be better understood when read in conjunction with the appended drawings of exemplary embodiments. It should be understood, however, that the invention is not limited to the precise arrangements and instrumentalities shown.

In the drawings.

Figure 1:
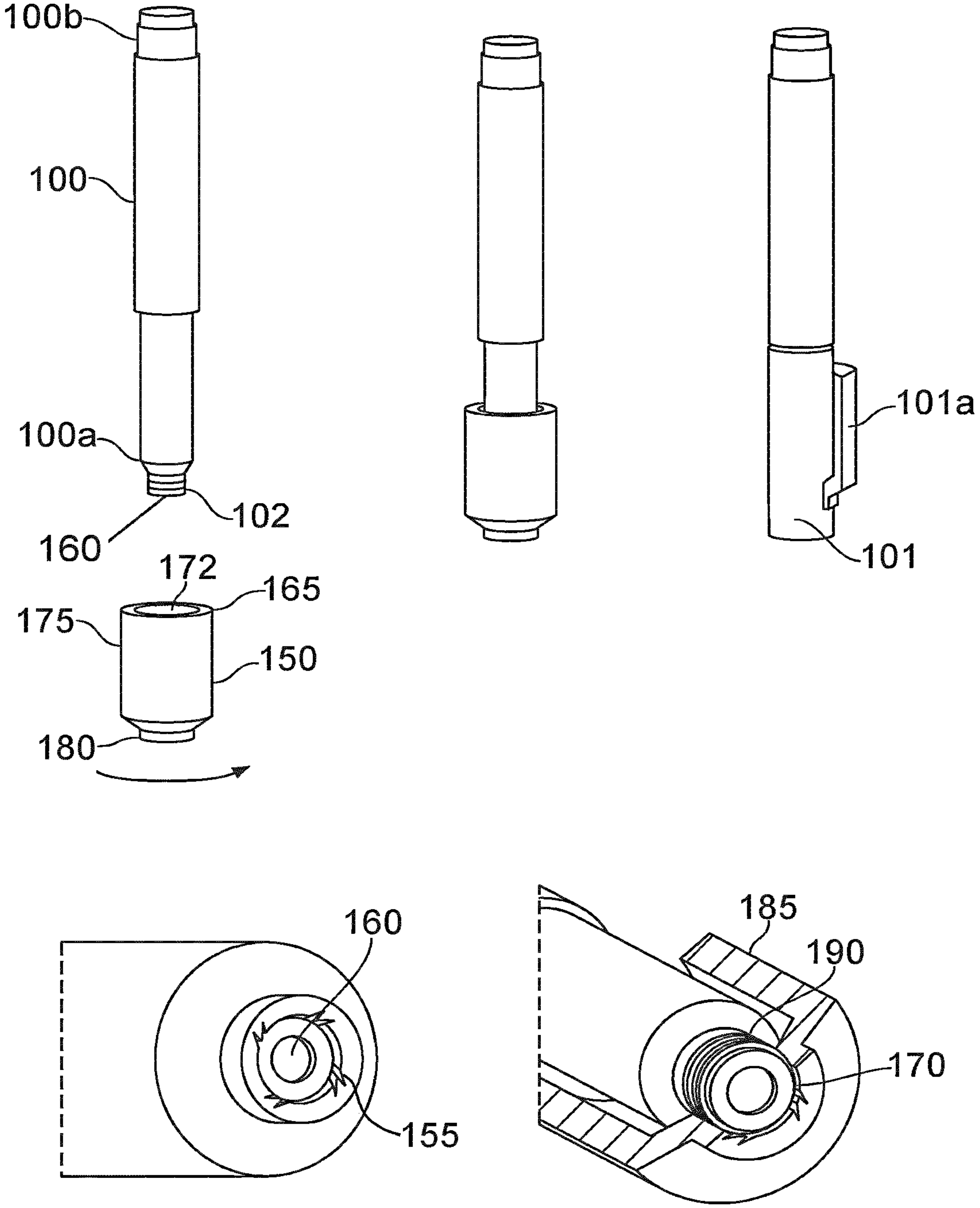
FIG. 1 is an exemplary adapter in accordance with a first exemplary embodiment of the present invention.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention It will be recognized that the features of the aspects of the invention(s) described herein can conveniently and interchangeably be used in any suitable combination. It will also be recognized that the invention covers not only individual embodiments but also combinations of the embodiments that have been discussed herein.

DETAILED DESCRIPTION OF THE EXEMPLARY EMBODIMENTS OF THE INVENTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Exemplary embodiments of the present invention provide an adapter for a fluid transfer device as shown in FIGS. 1-5. In use, adapter 150 may facilitate the use of pen 100 with a fluid transfer device. Specifically, adapter 150 may couple to pen 100, which stores a specific amount of a drug in fluid form. Adapter 150 may allow for pen 100 to be used with a fluid delivery device, such as the Ez Fill product. In use, adapter 150 may be placed within the vial receptacle of the Ez Fill product. Adapter 150 may allow pen 100 to align with a needle of the Ez-Fill product to allow the needle to puncture septum 160 of pen 100. When the transfer of the fluid from pen 100 to the desired vial via the Ez-Fill product is completed, pen 100 and adapter 150 may be removed from the Ez-Fill product. Adapter 150 may be configured to not be removable from pen 100. Further, Adapter 150 may be configured to prevent the coupling of a needle to pen 100, thereby preventing pen 100 from being used to directly inject the fluid stored in pen 100.

Referring to FIG. 1, adapter 150 may be configured to couple to a first fluid storage device, such as pen 100. Fluid storage device/pen 100 may store a specific amount of a drug. For example, pen 100 may store insulin that is to be injected into a user. Pen 100 may include proximal end 100*b* and distal end 100*a*. Distal end 100*a* may in some embodiments include a cover 101 when the fluid storage device/pen 100 is not in use, and may include a tip 102, which may be configured to couple to a needle or other device for transferring the fluid from pen 100 to the user or another storage container. Where a cover 101 is provided, the cover 101 may in accordance with some embodiments comprise an attachment means 101*a*, such as a resilient clip, for attaching the fluid storage device 100 to another object (e.g. a user's shirt pocket). During the operation of fluid storage device/pen 100, the cover 101 may be first removed to expose the tip 102. Distal end 100*a* of the fluid storage device/pen 100 may further include septum 160. Septum 160 may be punctured by a needle to allow for the fluid stored within pen 100 to be transferred to another device. Septum 160 may be configured to prevent the fluid stored within pen 100 from exiting pen 100 unless septum 160 is punctured. Tip 102 may include threads 190, which allow pen 100 to be coupled to a syringe or other device. Adapter 150 may be configured to couple to pen 100 such that adapter 150 is disposed around distal end 100*a*. Adapter 150 may include first end 175, second end 180, side wall 185, and retaining member 170. First end 175 may include a first cylinder which may include aperture 165. Aperture 165 may be configured to receive distal end 100*a* and tip 102 of pen 100. In some embodiments, side wall 185 is disposed around distal end 100*a* when distal end 100*a* and tip 102 are received by aperture 165. Aperture 165 may have a diameter larger than the diameter of retaining member 170. Second end 180 may include a second cylinder. In some embodiments, the first cylinder of first end 175 may taper down to the second cylinder of second end 180. First end 175 and second end 180 may be open on both ends creating through-bore 172. In some embodiments, retaining member 170 may be configured to engage with threads 190 of tip 102 to couple adapter 150 to pen 100. Retaining member 170 may include barbs 155. Barbs 155 may be configured to engage with threads 190 to allow pen 100 to be only rotated in one direction relative to adapter 150. For example, barbs 155 of retaining member 170 may be oriented to allow pen 100 to be rotated in only one direction for coupling adapter 150 to pen 100, preventing adapter 150 from being removed from pen 100 once coupled together. Barbs 155 may be oriented to be angled downwards away from tip 102 when retaining member 170 is being coupled to pen 100. Barbs 155 may engage with threads 190 to prevent adapter 150 from being removed from pen 100 by preventing rotation of pen 100 relative to adapter 150 in the direction necessary for removal of adapter 150 from pen 100. In some embodiments, adapter 150 remains permanently coupled to pen 100 and disposed of when pen 100 is disposed of. In alternative embodiments, a special tool may be used to remove adapter 150 from pen 100. In some embodiments, barbs 155 are a separate assembly component.

Figure 2:
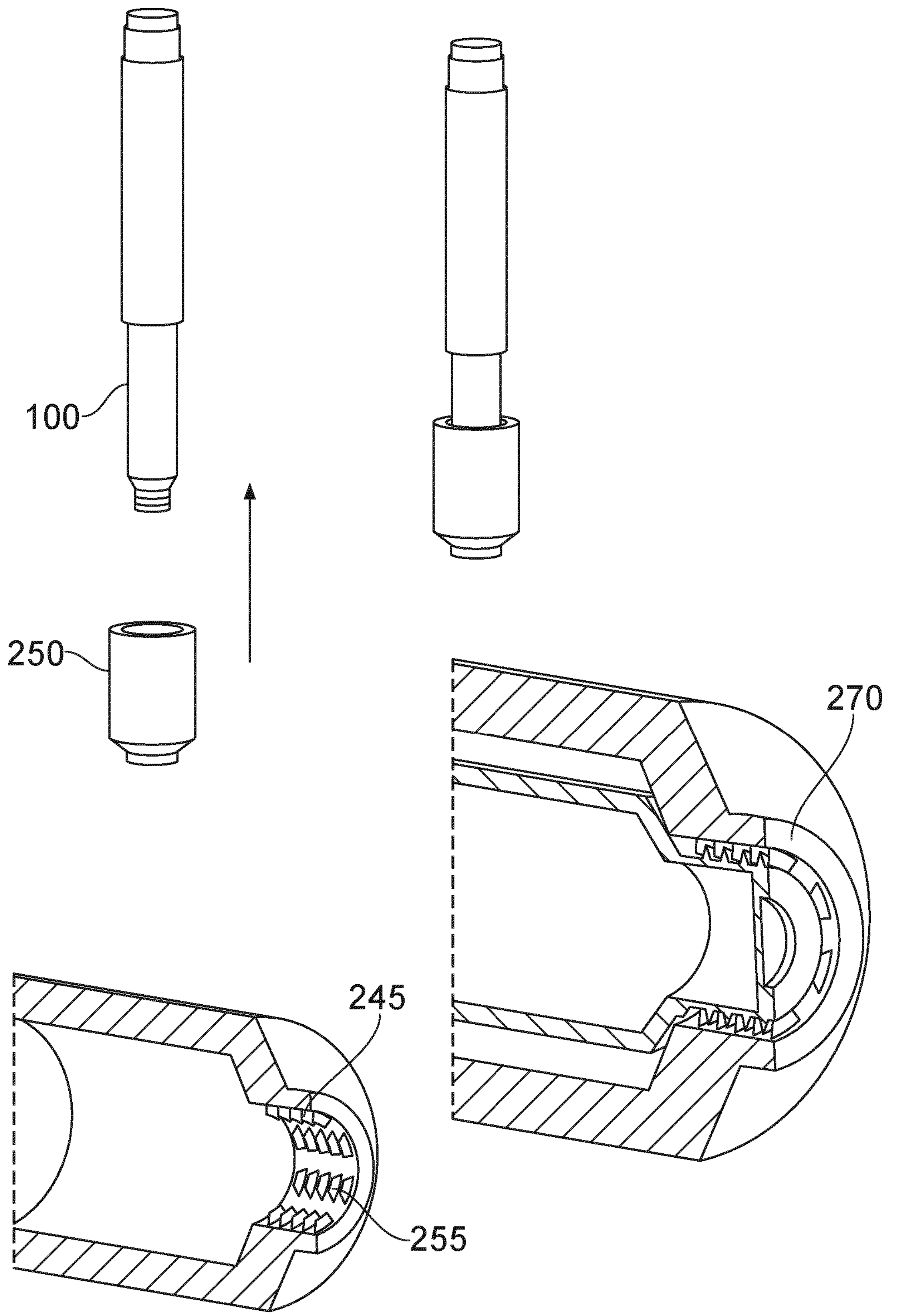
FIG. 2 is an exemplary adapter in accordance with a second exemplary embodiment of the present invention.

Referring to FIG. 2, there is shown a second embodiment of the adapter, generally designated 250. Adapter 250 is similar to the first embodiment of adapter 150 except that adapter 250 includes retaining member 270 instead of retaining member 170. Retaining member 270 may include integrated barbs 255, which may be integrated with threads 245 of adapter 250. Integrated barbs 255 may be formed with the molding of retaining member 270 or other fabrication of the retaining members 270. In some embodiments, integrated barbs 255 are oriented such that they are angled downwards when adapter 250 is coupled to pen 100. Integrated barbs 255 may be configured to engage with threads 190 when adapter 250 is pulled in a direction away from tip 102 of pen 100, preventing adapter 250 from becoming de-coupled from tip 102. In some embodiments, adapter 250 remains permanently coupled to pen 100 and disposed of when pen 100 is disposed of. In alternative embodiments, a special tool may be used to remove adapter 250 from pen 100. In some embodiments, integrated barbs 255 are a separate assembly component.

Figure 3:
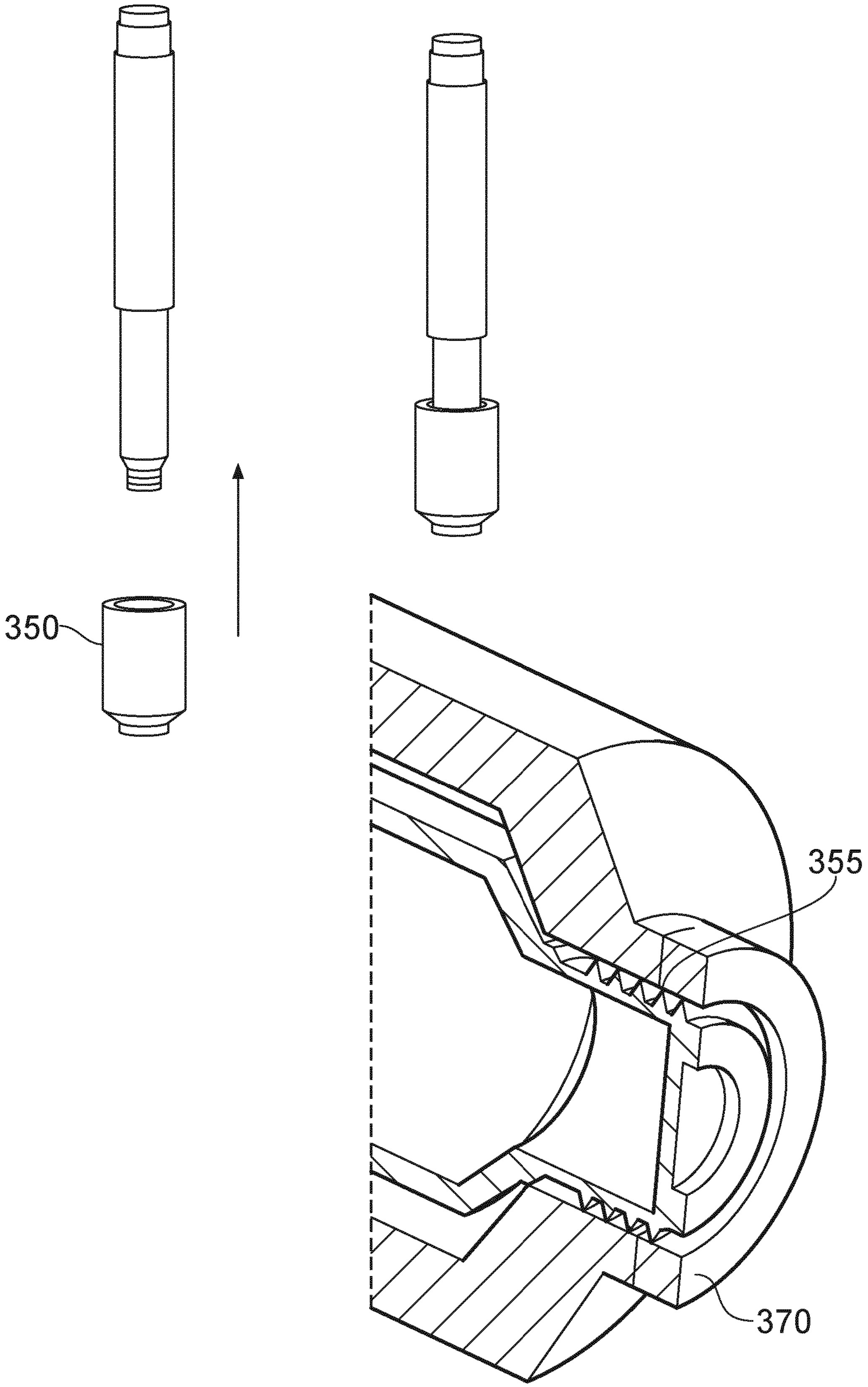
FIG. 3 is an exemplary adapter in accordance with a third exemplary embodiment of the present invention.

Referring to FIG. 3, there is shown a third embodiment of the adapter, generally designated 350. Adapter 350 is similar to the first embodiment of adapter 150 except that adapter 350 includes retaining member 370 instead of retaining member 170. Retaining member 370 may include attached barbs 355. In some embodiments, attached barbs 355 are a separate assembly component. Attached barbs 355 may be formed of a separate material inserted into a provided space within retaining member 370. Attached barbs 355 may be oriented such that they are angled down when adapter 350 is coupled to pen 100. Attached barbs 355 may be configured to engage with threads 190 when adapter 350 is attempted to be pulled away from tip 120 of pen 100. In some embodiments, adapter 350 remains permanently coupled to pen 100 and disposed of when pen 100 is disposed of. Attached barbs 355 may be comprised of a metal such as steel, stainless steel, nickel, brass, Nitinol or a plastic such as poly(phenylene sulfide) (PPS), polyetheretherketone (PEEK), polyether ketones (PEK), Polysulfone (PSU), poly(ethersulfone) (PES), polyetherimide (PEI), cyclo olefin polymer (COP), polycarbonate, or composites such as fiber filled materials including thermoplastics and thermosets such as epoxies.

In some embodiment, if enough force is applied to adapter 150, 250, or 350 in an attempt to remove them from tip 102, extensive damage may be done to threads 190 preventing a needle or other device from being coupled to tip 102 of pen 100.

Figure 4:
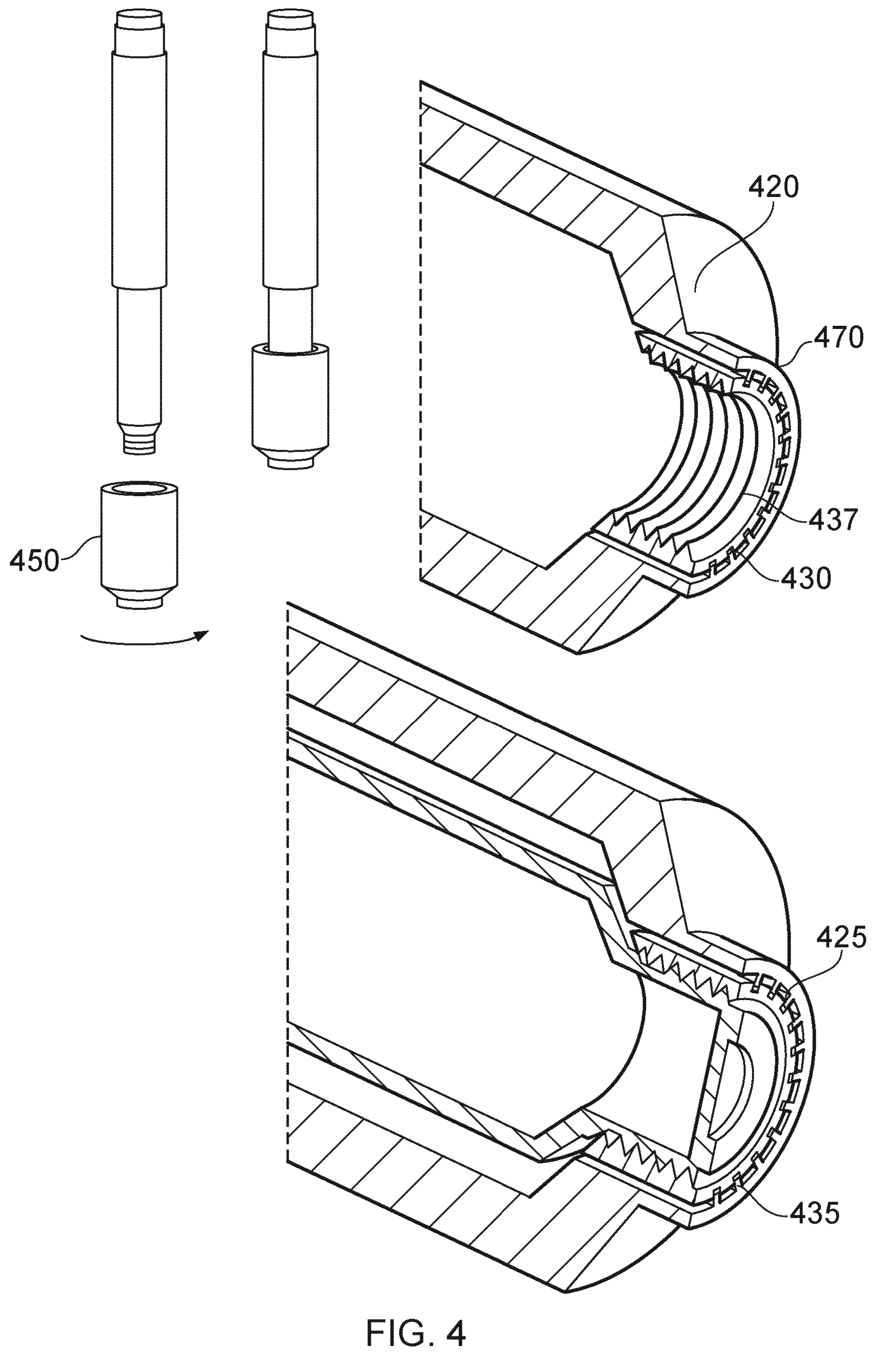
FIG. 4 is an exemplary adapter in accordance with a fourth exemplary embodiment of the present invention.

Referring to FIG. 4, there is shown a fourth embodiment of the adapter, generally designated 450. Adapter 450 is similar to the first embodiment of adapter 150 except that adapter 450 includes retaining member 470 instead of retaining member 170. Retaining member 470 includes inner ring 430 and outer housing 420. Inner ring 430 may be disposed within outer housing 420 may include threads 437, which may be configured to mate with threads 190 of pen 100. In some embodiments, inner ring 430 is configured to only rotate in one direction. When adapter 450 is being coupled to tip 102, inner ring 430 may be locked with outer housing 420 and thus does not rotate relative to outer housing 420. This allows threads 437 of inner ring 430 to engage with threads 190 of tip 102. Rotating tip 102 of pen 100 in the opposite direction to attempt to remove pen 100 from adapter 450 results in inner ring 430 rotating within outer housing 420, thereby preventing pen 100 from de-coupling with adapter 450. Pen 100 is prevented form de-coupling from adapter 450 since instead of rotating relative to inner ring 430, inner ring 430 and pen 100 rotate together, preventing pen 100 from disengaging with inner ring 430, and thus adapter 450

In some embodiments, outer housing 420 may include pawl features 425, and inner ring 430 may include catch features 435. Catch features 435 may be disposed on an exterior surface of inner ring 430 and may be configured to engage with pawl features 425 of outer housing 420. In some embodiments, outer housing 420 may include catch features 435, and inner ring 430 may include pawl features 425. In some embodiments, the rotational force of coupling inner ring 430 to tip 102 is transferred through pawl features 425 to catch features 435. When adapter 450 is rotated to couple to tip 102 of pen 100, pawl features 425 engage with catch features 435 thereby locking inner ring 430 with outer housing 420. When the rotation is reversed in an attempt to de-coupled adapter 450 from tip 102, pawl features 425 do not engage with catch features 435 and thus inner ring 430 rotates with tip 102 relative to outer housing 420, preventing inner ring 430 from de-coupling from tip 102 of pen 100. For example, pawl features 425 of outer housing 420 and catch features 435 of inner ring 430 may engage with each other in a relative clockwise motion, but may slip past each other in relative counter-clockwise motion. In some embodiments, pawl features 425 and catch features 435 may be complementary ratchet teeth axially stacked or concentric to each other.

Figure 5:
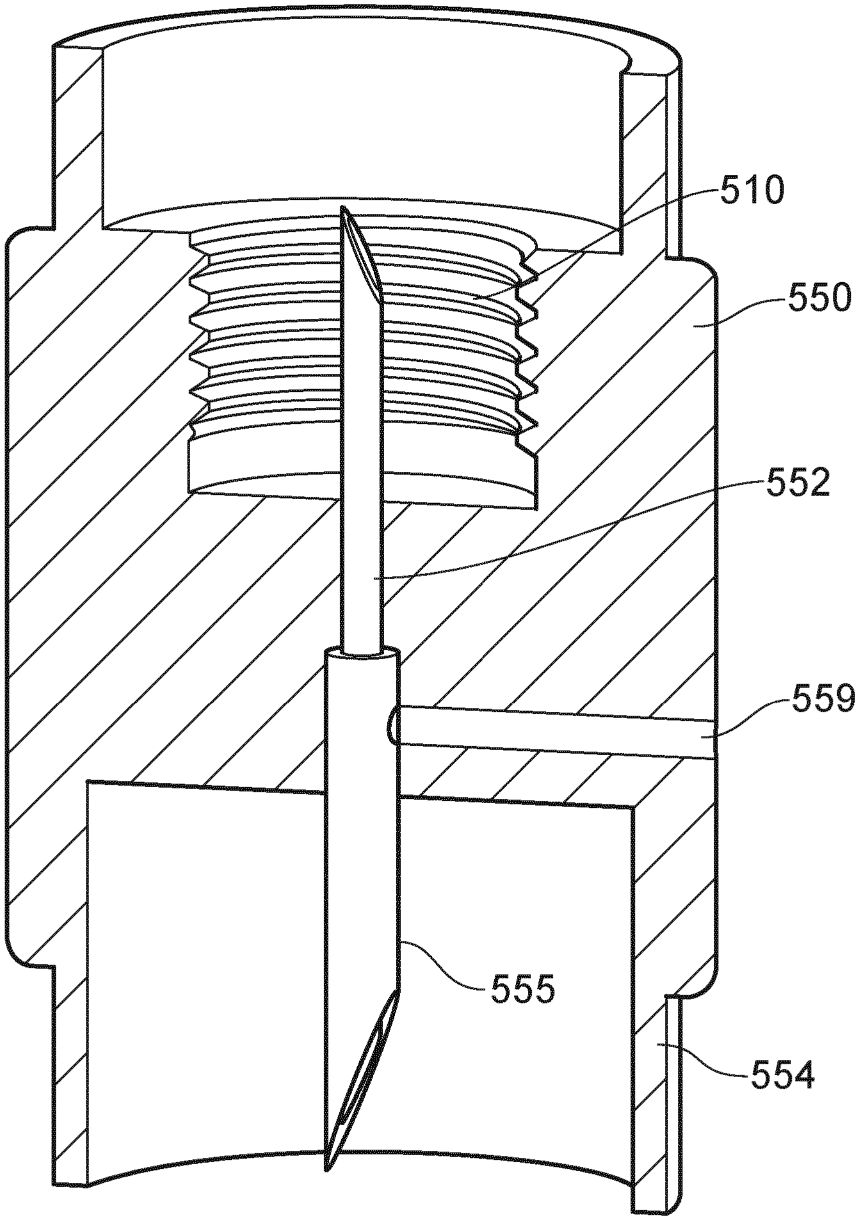
FIG. 5 is an exemplary adapter for use with one or more of the exemplary embodiments of the present invention.

Referring to FIG. 5, there is shown a fifth embodiment of the adapter, generally designated 550. Adapter 550 may include transfer element 552. Transfer element 552 may be configured to transfer the fluid from pen 100 to a vial or other container with a septum seal. For example, transfer element 552 may be a continuous needle to transfer the fluid stored within pen 100 to a vial (not shown). Adapter 550 may also include concentric outer needle 555 surrounding the lower part of transfer element 552. In some embodiments, extended side wall 554 may be configured to shield transfer element 552 from a user to prevent injury. Pen 100 may be screwed into the threads 510. Adapter 550 may be placed over the neck of a vial with side wall 554 surrounding the vial seal and the ends of transfer element 552 and concentric outer needle 555. The user depresses a button located on pen 100, forcing the contents of pen 100 through transfer element 552 into the receiving vial while the air from the vial can egress/escape through the annular space between transfer element 552 and concentric outer needle 555 via port 559. Once the liquid is transferred, the vial can be used in any system that utilizes the vial format. Port 559 may include a fluid trap or filter to prevent over fill from escaping. Port 559 may include a filter to prevent odor from escaping. Port 559 may include a variable volume chamber to trap excess fluid without creating an increase in the system pressure.

Figure 6:
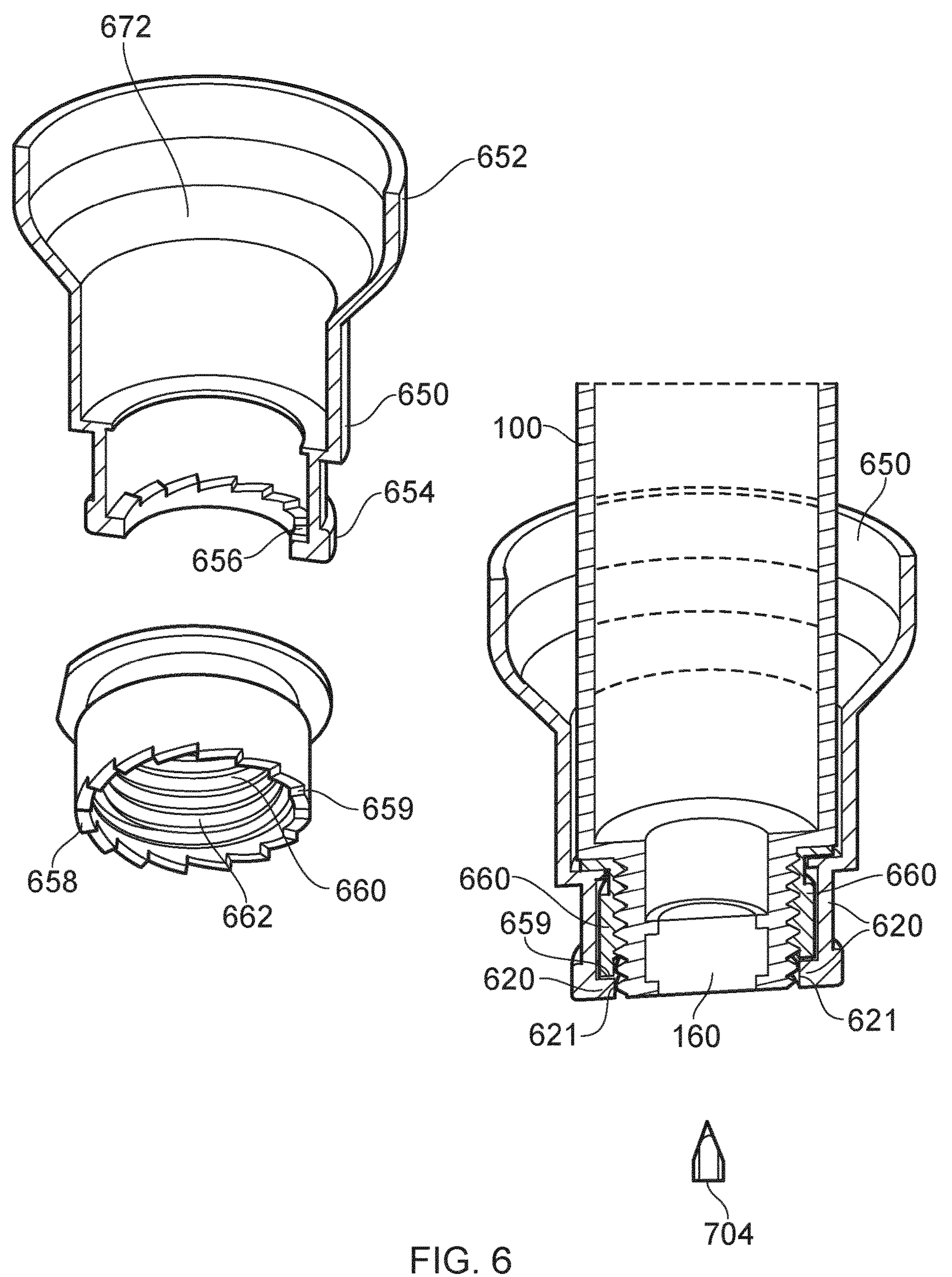
FIG. 6 is an exemplary adapter in accordance with a fifth exemplary embodiment of the present invention.

Referring to FIG. 6, there is shown a sixth embodiment of the adapter, generally designated 650. Adapter 650 may include first end 652, second end 654, and inner ring 660. As with a number of the previous embodiments, first end 652 and second end 654 may be open on both ends creating through-bore 672. First end 652 may be flared and may have an outer diameter greater than the outer diameter of second end 654. In some embodiments, the outer diameter of first end 652 may be greater than the outer diameter of pen 100. First end 652 may include a first cylinder that tapers down to a second cylinder. Second end 654 may be cylindrical in shape and may be in open communication with first end 652. Second end 654 may include engagement features 656. Engagement features 656 may be configured to engage with locking features 658 of inner ring 660.

Inner ring 660 may be configured to sit within second end 654, whereby a portion of the second end 654 forms an outer housing 620, against which the inner ring 660 engages. In the embodiment shown in FIG. 6, an end wall 659 of the inner ring 660 is configured to sit on an inwardly projecting shoulder 621 of the outer housing 620. Inner ring 660 may include threads 662 which mate with threads 190 of pen 100. In some embodiments, inner ring 656 is configured to only rotate in one direction. When adapter 650 is being coupled to tip 102, engagement features 656, such as ratchet teeth located on the inwardly projecting shoulder 621 (as shown in the embodiment of FIG. 6), may engage with locking features 658, such as complementary ratchet teeth located on the end wall 659 of the inner ring 660 (as shown in the embodiment of FIG. 6), to lock inner ring 660 with second end 654 and preventing rotation of inner ring 660 relative to adapter 650. This allows threads 662 of inner ring 656 to engage with threads 190 of pen 100. Rotating pen 100 in the opposite direction to attempt to remove pen 100 from adapter 650 results in inner ring 660 rotating within second end 654, as engagement features 656 no longer engage with locking features 658. When inner ring 660 is coupled to pen 100 and allowed to rotate relative to adapter 650, pen 100 cannot be de-coupled from adapter 650.

Figure 7C:
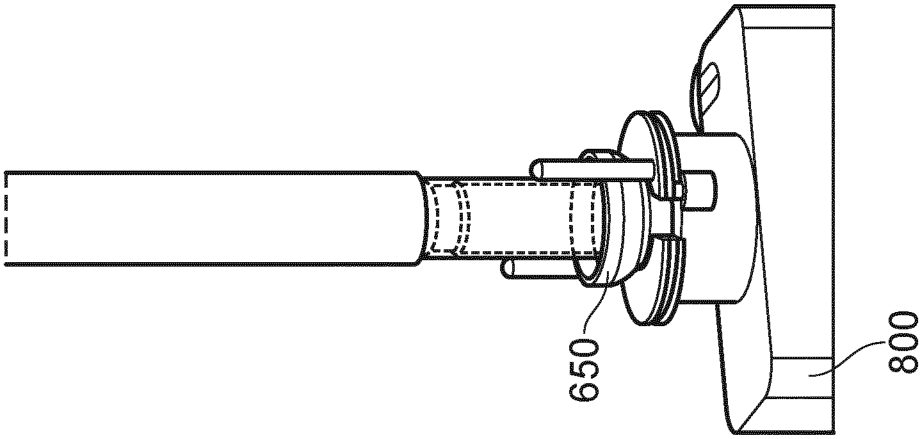
FIGS. 7A-7C are an exemplary use of the adapter of FIG. 6 in accordance with an exemplary embodiment of the present invention.
Figure 7B:
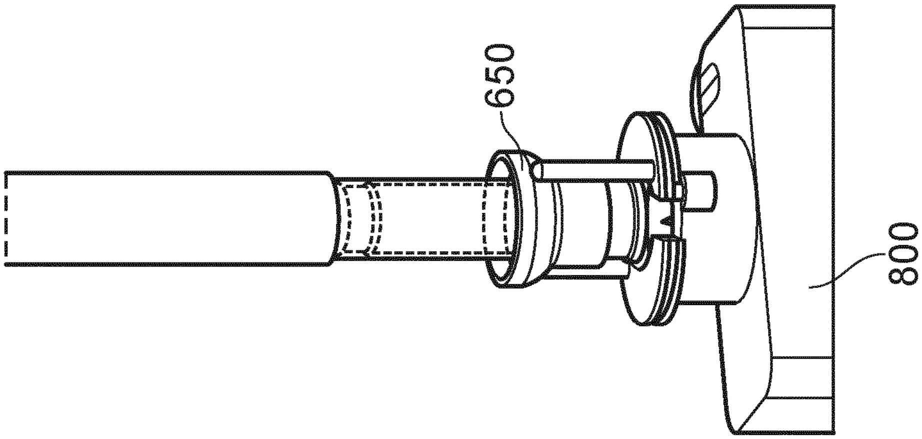
Figure 7A:
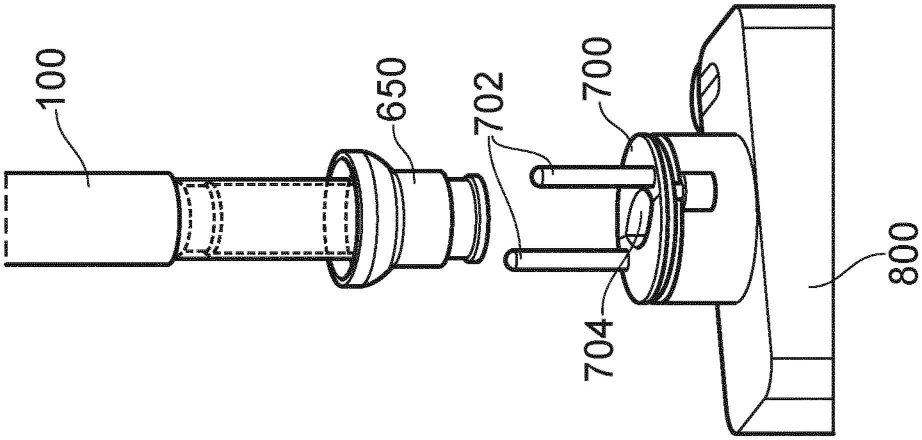

Referring to FIGS. 7A-7C, adapter 650 may be used with fluid transfer device 800. Fluid transfer device 800 may include slot 700 and members 702, alongside a needle 704 (shown in FIG. 6) if applicable for piercing any septum 160 from the fluid storage device/pen 100. Slot 700 may be configured to move between an open position or closed position to allow access to fluid transfer device 800. Slot 700 may be biased to remain in a closed position using a biasing member, such as a spring. For example, as illustrated in 7A, slot 700 may be in a closed position preventing access to opening 704. In some embodiments, the flared configuration of first end 652 may engage one or more actuation members 702, which in the particular embodiment of FIG. 7 are shown as one or more actuation projections, as adapter 650 enter slot 700 of fluid transfer device 800. Referring to FIG. 7B, the flared configuration of first end 652 causes the actuation members 702 to separate from each other as adapter 650 is moved proximate to fluid transfer device 800, thereby opening slot 700. As first end 652 engages with actuation members 702 and causes them to be moved apart relative to each other, slot 700 may open to allow adapter 650 to enter opening 704. In the particular embodiment of FIG. 7B, it can be seen that the actuation members 702 may notionally extend around a circumference/perimeter of the slot 70. In this way, the slot can be actuated from a number of different positions around the slot using the different actuation members 702 located around the slot 700. Referring to FIG. 7C, adapter 650 has been fully inserted into opening 704 through slot 700 as members 702 are fully spaced apart due to engagement with the flared configuration of first end 652. Although the embodiment from FIGS. 7A-7C comprise more than one actuation member, it will be appreciated that in some other embodiments that there may be only one actuation member 702 provided/needed for moving the slot 702 from its closed position to its open position.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Also described herein is an adapter for transferring fluid between a first device and a second device. The adapter comprises a first end for receiving the first device, wherein the first end includes a side wall for locating around the first device. The adapter further comprises a second end for engaging the first device, and including a retaining member, wherein the retaining member is operable to prevent removal of the first device from the adapter upon engagement of the first device with the second end. The first end and the second end are open on both ends to comprise a through-bore extending through the adapter. In some cases, the first device may be a drug pen containing insulin and/or some other medicament(s).

Also described herein are the embodiments outlined in the following numbered paragraphs:

1. An adapter for use with a fluid transfer device comprising:
   - a first end including a side wall configured to be disposed around a fluid storage device having a tip;
   - a second end including a retaining member configured to non-removably couple to the tip of the fluid storage device,
   - wherein the retaining member only allows rotation of the first end and second end in a first direction and prevents rotation of the first end and second end in a second direction.

2. The adapter of paragraph 1, wherein the retaining member includes at least one barb.

3. The adapter of paragraph 2, wherein the at least one barb is integrated with at least one thread of the retaining member.

4. The adapter of paragraph 1, wherein the first end has a diameter larger than a diameter of the second end.

5. The adapter of paragraph 1, wherein the retaining member includes an inner ring and an outer housing, the inner ring configured to engage with the tip and the outer housing configured to engage with the inner ring.

6. The adapter of paragraph 5, wherein inner ring is configured to only rotate in one direction relative to outer housing.

7. The adapter of paragraph 5, wherein the inner ring includes at least one pawl feature and the outer housing includes at least one catch feature.

8. The adapter of claim 5, wherein the outer housing includes at least one pawl feature and the inner ring includes at least one catch feature.

9. The adapter of paragraph 1, wherein the first end and the second end are open on both ends to comprise a through-bore extending through the adapter.

10. The adapter of paragraph 1, wherein the first end includes an outer diameter larger than an outer diameter of the second end.

11. The adapter of paragraph 5, wherein the inner ring and the outer housing include mating features that engage each other in a relative clockwise motion and slip past each other in a relative counter-clockwise motion.

12. The adapter of paragraph 11, wherein the inner ring and the outer housing have complimentary ratchet teeth axially stacked or concentric to each other.

13. A method of transferring a fluid comprising:
   - inserting a fluid storage device into an adapter, the fluid storage device including a tip having threads;
   - rotating the adapter to non-removably threadably engage the adapter with the tip, wherein the adapter is configured to only allow the tip to rotate in a single direction relative to the adapter;
   - coupling the fluid storage device and the adapter to a fluid transfer device, the fluid transfer device configured to couple with the adapter; and
   - transferring fluid from the fluid storage device to the fluid transfer device through the adapter.

What is claimed is:

1. An adapter for transferring fluid between a first device and a second device, the adapter comprising:
   - a first end for receiving the first device, wherein the first end includes a side wall for locating around the first device; and
   - a second end for engaging the first device, wherein the second end includes a retaining member, wherein the retaining member is operable to prevent removal of the first device from the adapter upon engagement of the first device with the second end via at least one barb configured to engage with the threads of the first device to allow the first device to be rotated in only one direction relative to the adapter,
   - wherein the first end and the second end are both open to comprise a through-bore extending through the adapter.

2. The adapter of claim 1, wherein each barb projects inwardly from the retaining member.

3. The adapter of claim 1, wherein the retaining member comprises a thread for attaching the adapter to the first device.

4. The adapter of claim 3, wherein the thread is a female thread.

5. The adapter of claim 3, wherein the retaining member includes at least one barb that is integrated with the thread of the retaining member.

6. The adapter of claim 1, wherein the first end has a diameter larger than a diameter of the second end.

7. The adapter of claim 1, wherein the first end includes an outer diameter larger than an outer diameter of the second end.

8. The adapter of claim 1, wherein the retaining member includes an inner ring and an outer housing, wherein the inner ring is configured to engage with the outer housing.

9. The adapter of claim 8, wherein the inner ring is configured to only rotate in one direction relative to outer housing.

10. The adapter of claim 8, wherein the inner ring includes at least one pawl feature and the outer housing includes at least one catch feature for engaging with the at least one pawl feature.

11. The adapter of claim 8, wherein the outer housing includes at least one pawl feature and the inner ring includes at least one catch feature for engaging with the at least one pawl feature.

12. The adapter of claim 8, wherein the inner ring and the outer housing include mating features that engage each other in one of a relative clockwise or anti-clockwise motion, and slip past each other in the other of the relative clockwise or counter-clockwise motion.

13. The adapter of claim 12, wherein the inner ring and the outer housing have complementary ratchet teeth axially stacked or concentric to each other.

14. The adapter of claim 8, wherein the outer housing further comprises an inwardly projecting shoulder, wherein an end wall of the inner ring is configured to sit on the inwardly projecting shoulder.

15. The adapter of claim 14, wherein the inner ring and the outer housing have complementary ratchet teeth axially stacked or concentric to each other that are located on the end wall of the inner ring and on the inwardly projecting shoulder.

16. The adapter of claim 8, wherein the retaining member comprises a thread for attaching the adapter to the first device and the inner ring comprises the thread for attaching the adapter to the first device.

17. The adapter of claim 1, further comprising a port in fluid communication with the through-bore, wherein the port is positioned between the first end and the second end.

18. The adapter of claim 17, wherein the port comprises a filter.

19. The adapter of claim 1, wherein the first end comprises a flared portion comprising an internal and/or external diameter which progressively decreases from the first end towards the second end.

20. An assembly comprising:

the adapter of claim 1; and the second device, wherein the second device is a fluid transfer device that is engaged with the adapter.

21. The assembly of claim 20, wherein the second device comprises a slot for engaging with the adapter, wherein the slot is moveable between a first position in which the slot is closed, and a second position in which the slot is open.

22. The assembly of claim 21, wherein in the closed position the slot comprises an opening with a first opening size, and wherein in the open position of the slot, the opening comprises a second opening size which is larger than the first opening size.

23. The assembly of claim 21, wherein the second device further comprises at least one actuation member, wherein each actuation member is configured to engage with the first device to move the slot from the closed position to the open position.

24. The assembly of claim 23, wherein each actuation member is an actuation projection.

25. The assembly of claim 23, wherein the at least one actuation member comprises a plurality of actuation members.

26. The assembly of claim 25, wherein the plurality of actuation members extend around a circumference of the slot.

27. The assembly of claim 21, wherein the slot is biased towards the first position.

28. The assembly of claim 20, further comprising the first device, wherein the first device is a fluid storage device that is engaged with the adapter.

29. The assembly of claim 28, wherein the fluid storage device contains insulin.

30. The assembly according to claim 28, wherein the first device further comprises a septum, and the second device further comprises a needle, wherein the needle from the second device pierces the septum of the first device.

31. The adapter of claim 1, wherein a distal end of the first device comprises threads.

32. The adapter of claim 31, wherein the at least one barb is configured to allow the first device to slip over the barb when the first device is rotated relative to the adapter in a first direction and wherein the at least one barb is configured to engage the first device to prevent the first device from rotating when the first device is rotated relative to the adapter in a second direction.

33. The adapter of claim 1, further comprising a plurality of barbs interspersed around the retaining member.

34. The adapter of claim 1, further comprising four sets of two barbs located around a central axis of the adapter.

35. The adapter of claim 32, wherein the at least one barb is disposed at an angle such that the barb catches with the threads of the first device and prevents rotation of the first device relative to the adapter in the direction necessary for removal of the adapter from the first device.

36. The adapter of claim 35, wherein the at least one barb is configured to allow the threads of the first device to engage with the retaining member such that the adapter is coupled to the first device.

37. The adapter of claim 32, wherein each barb is oriented to be angled downwards away from the distal end of the first device when the retaining member is coupled to the first device.

38. The adapter of claim 36, wherein the adapter remains permanently coupled to the first device.

39. The adapter of claim 36, wherein a special tool may be used to remove the adapter from the first device.

40. The adapter of claim 1, wherein the at least one barb is a separate assembly component.

41. An adapter for transferring fluid between a first device and a second device, the adapter comprising:

a first end for receiving the first device, wherein the first end includes a side wall for locating around the first device; and a second end for engaging the first device, wherein the second end includes a retaining member, wherein the retaining member is operable to prevent removal of the first device from the adapter upon engagement of the first device with the second end via at least one barb configured to allow the first device to be rotated in only one direction relative to the adapter, wherein the first end and the second end are both open to comprise a through-bore extending through the adapter, and wherein the first end is further configured to include an outer diameter larger than an outer diameter of the second end.

* * * * *